United States Patent [19]
Field

[11] Patent Number: 4,627,912
[45] Date of Patent: Dec. 9, 1986

[54] REFORMING PROCESS HAVING A HIGH SELECTIVITY AND ACTIVITY FOR DEHYDROCYCLIZATION, ISOMERIZATION, AND DEHYDROISOMERIZATION

[75] Inventor: Leslie A. Field, Oakland, Calif.

[73] Assignee: Chevron Research Company, San Francisco, Calif.

[21] Appl. No.: 550,841

[22] Filed: Nov. 14, 1983

Related U.S. Application Data

[63] Continuation of Ser. No. 509,277, Jun. 30, 1983, abandoned.

[51] Int. Cl.$^4$ .............................................. C10G 35/08
[52] U.S. Cl. .................................... 708/139; 208/138; 585/418; 585/419; 585/434; 585/747
[58] Field of Search ............... 208/139, 138; 585/418, 585/419, 434, 747

[56] References Cited

U.S. PATENT DOCUMENTS

| | | | |
|---|---|---|---|
| 3,397,137 | 8/1968 | Pickert et al. | 208/138 |
| 3,523,914 | 8/1970 | Mitsche | 252/455 |
| 3,573,199 | 3/1971 | McCoy | 208/139 |
| 3,783,123 | 1/1974 | Young | 208/111 |
| 4,104,320 | 8/1978 | Bernard et al. | 208/141 |
| 4,191,638 | 3/1980 | Plank et al. | 208/139 |
| 4,325,808 | 4/1982 | Kim et al. | 208/139 |
| 4,375,405 | 3/1983 | Garuert | 208/139 |

FOREIGN PATENT DOCUMENTS 895280  3/1972  Canada .

Primary Examiner—Curtis R. Davis
Attorney, Agent, or Firm—S. R. La Paglia; E. A. Schaal; P. L. McGarrigle, Jr.

[57] ABSTRACT

A hydrocarbon conversion process is disclosed wherein a hydrocarbon feed is contacted with a reforming catalyst in the presence of a halogen at conditions which favor dehydrocyclization, isomerization, and dehydroisomerization of the hydrocarbon feed. The degree of the isomerization and dehydroisomerization is controlled by adjusting the amount of halogen present. The amount of halogen present can be adjusted on stream by the addition of halogen-containing gas or water. The reforming catalyst comprises a large-pore zeolite, containing at least one Group VIII metal. In one embodiment, the reforming catalyst comprises: (a) a large-pore zeolite containing barium and platinum; and (b) an acidic or acidifiable inorganic binder selected from the group consisting of silica-alumina, zirconia-silica and alumina.

9 Claims, No Drawings

REFORMING PROCESS HAVING A HIGH SELECTIVITY AND ACTIVITY FOR DEHYDROCYCLIZATION, ISOMERIZATION, AND DEHYDROISOMERIZATION

This is a continuation of application Ser. No. 509,277 filed 6/30/83, and now abandoned.

BACKGROUND OF THE INVENTION

The present invention concerns contacting a hydrocarbon feed with a new reforming catalyst which has a superior selectivity and activity for dehydrocyclization, isomerization, and dehydroisomerization.

Catalytic reforming is well known in the petroleum industry. It involves treating naphtha fractions to improve the octane rating by producing aromatics and isomerizing normal and singly branched paraffins. The more important hydrocarbon reactions occurring during reforming operation include dehydrogenation of cyclohexanes to aromatics, dehydroisomerization of alkylcyclopentanes to aromatics, dehydrocyclization of acyclic hydrocarbons to aromatics, dealkylation of alkylbenzenes, isomerization of paraffins, and hydrocracking reactions which produce light gaseous hydrocarbons, e.g., methane, ethane, propane and butanes. Hydrocracking reactions should be minimized during reforming as they decrease both the yield of products in the gasoline boiling range and the hydrogen.

Because of the demand for high octane gasoline for use in motor fuels, extensive research is being devoted to developing improved reforming catalysts and catalytic reforming processes. Catalysts for reforming processes must be able to produce high yields of liquid products in the gasoline boiling range (containing large concentrations of high octane number aromatic hydrocarbons) and low yields of light gaseous hydrocarbons. The catalysts should possess good activity in order that the temperature required to produce a certain quality product need not be too high. The catalysts should also either possess good stability, in order that the activity and selectivity characteristics can be retained during prolonged periods of operation, or be sufficiently regenerable to allow frequent regeneration without loss of performance.

Catalysts comprising platinum, for example, platinum and rhenium supported on alumina, are widely used for the reforming of naphthas.

The use of carriers other than alumina has been studied and it was proposed to use certain molecular sieves such as X and Y zeolites, which have pores large enough for hydrocarbons in the gasoline boiling range to pass through. However, reforming catalysts based upon these molecular sieves have not been commercially successful.

In conventional reforming, the hydrocarbons to be converted are passed over the catalyst, in the presence of hydrogen, at temperatures of about 450° C. to 550° C. and pressures of about 50 to 500 psig. Part of the hydrocarbons are converted into aromatic hydrocarbons, and the reaction is accompanied by isomerization and cracking reactions which also convert the paraffins into isoparaffins and lighter hydrocarbons.

The catalysts hitherto used have given fairly satisfactory results with heavy paraffins, but less satisfactory results with $C_6$-$C_8$ paraffins, particularly $C_6$ paraffins. Catalysts based on a type L zeolite are more selective with regard to the dehydrocyclization reaction and produce excellent results with $C_6$-$C_8$ paraffins.

The selectivities of these catalysts for dehydrocyclization are so great that little isomerization and direct dehydroisomerization occurs. While it is highly desirable to reduce the amount of hydrocracking occurring in reforming, some isomerization is desirable to convert unreacted straight-chain and singly branched paraffins to isomers having higher octane numbers. While cyclopentanes can be converted to aromatics by ring opening followed by dehydrocyclization, a more favored route is to go directly to aromatics by dehydroisomerization.

SUMMARY OF THE INVENTION

The present invention overcomes the deficiencies of the prior art by contacting a hydrocarbon feed with a large-pore zeolite containing at least one Group VIII metal in the presence of a halogen at conditions which favor dehydrocyclization, isomerization and dehydroisomerization of the hydrocarbon feed. The degree of isomerization is controlled by adjusting the amount of halogen present. Preferably, the halogen is hydrochloric acid, or a readily decomposed chlorine-containing organic material, which is a gas at reforming conditions, such as tertiary butyl chloride.

The large-pore zeolite may contain an alkaline earth metal, such as barium, strontium, and calcium. Preferably, the Group VIII metal is platinum. One such large-pore zeolite might contain from 8% to 10% by weight barium and from 0.6% to 1.0% by weight platinum.

Preferably, the large-pore zeolite is a type L zeolite. At least 80% of the crystals of the type L zeolite should be larger than 1000 Angstroms. An acidic or acidifiable inorganic binder, such as silica-alumina, zirconia-silica or alumina, may be used to bind the zeolite.

DESCRIPTION OF THE PREFERRED EMBODIMENTS

In its broadest aspect, the present invention involves contacting a hydrocarbon feed with a zeolitic catalyst in the presence of a halogen. The halogen imparts acidity to the catalyst. The halogen can be either previously introduced acidic component on the catalyst binder during catalyst preparation, or can be introduced during processing of the hydrocarbon feed.

The degree of isomerization and dehydroisomerization can be controlled by adjusting the amount of halogen or water present (water can reduce the amount of halogen on the catalyst). Thus, adjusting the amount of halogen or water present provides the ability to tailor the catalyst acidity and selectivity as desired during operation.

While it is highly desirable to reduce the amount of hydrocracking occurring in reforming, some small controlled amount of cracking may be desirable to generate heat. The dehydrocyclization reaction is highly endothermic, while cracking is exothermic.

The term "selectivity" as used in the present invention is defined as the percentage of moles of acyclic hydrocarbons and alkylcyclopentanes converted to aromatics and isomerized paraffins relative to moles converted to aromatics, isomerized paraffins, and cracked products, $$\text{i.e., Selectivity} = \frac{100 \times \text{moles of acyclic hydrocarbons and alkylcyclopentanes converted to aromatics and isomerized paraffins}}{\text{moles of acyclic hydrocarbons and alkylcyclopentanes converted to aromatics, isomerized paraffins, and cracked products}}$$

The selectivity for converting acyclic hydrocarbons and alkylcyclopentanes to aromatics and isomerized paraffins is a measure of the efficiency of the process in converting acyclic hydrocarbons and alkylcyclopentanes to the desired and valuable products: aromatics, singly or multiply branched paraffins, and hydrogen, as opposed to the less desirable products of hydrocracking.

The dehydrogenation reaction converting cyclohexane and alkylcyclohexanes to aromatics is easily accomplished using the present catalyst, as well as those of the prior art.

Feedstock

The feedstock used in the present invention is a naphtha boiling in the gasoline range, containing at least some acyclic hydrocarbons or alkylcyclopentanes.

Preferably, the feedstock is substantially free of sulfur, nitrogen, metals, and other known poisons for reforming catalysts. The catalyst is especially sensitive to sulfur. The feedstock can be made substantially free of known poisons by conventional hydrofining techniques followed by sorbents that remove the remaining sulfur compounds.

Reforming Reaction

According to the present invention, the hydrocarbon feed is contacted with the catalyst in a fixed bed system, a moving bed system, a fluidized system, or in a batch-type operation. In view of the danger of attrition losses of the valuable catalyst, it is preferred to use either a fixed bed system or a dense-phase moving bed system. In a fixed bed system, the hydrocarbon feed is preheated by any suitable heating means to the desired reaction temperature and then passed into a reforming zone containing a fixed bed of the catalyst. The reforming zone may be one or more separate reactors with suitable means therebetween to ensure that the desired conversion temperature is maintained at the entrance to each reactor. The reactants may be contacted with the catalyst bed in either upward, downward, or radial flow fashion. In a multiple bed system, the present catalyst may be used in less than all of the beds, with a conventional dual-functional catalyst being used in the remainder of the beds, either preceding or following the present catalyst.

Ordinarily, hydrogen is utilized in amounts sufficient to insure a hydrogen to hydrocarbon mole ratio of about 0 to about 20:1, with best results obtained in the range of about 1:1 to about 6:1. The hydrogen charged to the reforming zone will typically be contained in a hydrogen-rich gas stream recycled from the effluent stream from this zone after a suitable gas/liquid separation step.

The conditions include a reactor pressure of about 1 atmosphere to about 500 psig, with the preferred pressure being about 50 psig to about 200 psig. The temperature at which the reforming is carried out is preferably about 450° C. to about 550° C. As is well known to those skilled in the art, the initial selection of the temperature within this broad range is made primarily as a function of the desired conversion level of the hydrocarbon feed considering the characteristics of the charge stock and of the catalyst. Ordinarily, the temperature then is thereafter slowly increased during the run to compensate for the inevitable deactivation that occurs to provide a relatively constant value for conversion.

The liquid hourly space velocity (LHSV) is from about 0.1 to about 10 hr.$^{-1}$, with a value of about 0.3 to about 5 hr.$^{-1}$ being preferred.

Reforming generally results in the production of hydrogen. Thus, hydrogen usually need not be added to the reforming system except for pre-reduction of the catalyst and when the feed is first introduced. Generally, once reforming is underway, part of the hydrogen produced is recirculated over the catalyst. The presence of hydrogen serves to reduce the formation of coke which tends to poison the catalyst.

The reforming catalyst according to the invention has as a component a large-pore zeolite charged with one or more dehydrogenating constituents. The term "large-pore zeolite" is defined as a zeolite having an effective pore diameter of 6 to 15 Angstroms.

Type L zeolite, zeolite X, zeolite Y and faujasite are thought to be the best large-pore zeolites for this operation and have apparent pore sizes on the order of from 7 to 9 Angstroms.

The chemical formula for zeolite Y expressed in terms of moles of oxides may be written as:

$$(0.7-1.1)Na_2O:Al_2O_3:xSiO_2:yH_2O$$

wherein x is a value greater than 3 up to about 6 and y may be a value up to about 9. Zeolite Y is described in more detail in U.S. Pat. No. 3,130,007, which is hereby incorporated by reference to show a zeolite useful in the present invention.

Zeolite X is a synthetic crystalline zeolitic molecular sieve which may be represented by the formula:

$$(0.7-1.1)M_{2/n}O:Al_2O_3:(2.0-3.0)SiO_2:yH_2O$$

wherein M represents a metal, particularly alkali and alkaline earth metals, n is the valence of M, and y may have any value up to about 8 depending on the identity of M and the degree of hydration of the crystalline zeolite. Zeolite X, its X-ray diffraction pattern, its properties, and method for its preparation are described in detail in U.S. Pat. No. 2,882,244, which is hereby incorporated by reference to show a zeolite useful in the present invention.

The preferred catalyst according to the invention has as a component a type L zeolite charged with one or more dehydrogenating constituents.

Type L zeolites are synthetic zeolites. A theoretical formula is $M_{9/n}[(AlO_2)_9(SiO_2)_{27}]$ in which M is a cation having the valency n.

The real formula may vary without changing the crystalline structure; for example, the mole ratio of silicon to aluminum (Si/Al) may vary from 1.0 to 3.5.

U.S. Pat. No. 3,216,789 is hereby incorporated by reference to show a type L zeolite useful in the present invention.

Crystal size has an effect on the stability of the catalyst. For reasons not yet fully understood, catalysts having at least 80% of the crystals of the type L zeolite larger than 1000 Angstroms possess greater stability than do catalysts wherein substantially all of the crystals of the type L zeolite are between 200 and 500 Angstroms. Thus, the larger of these crystallite sizes of type L zeolite is the preferred zeolite.

Alkaline Earth Metals

A possible element of the present invention is the presence of an alkaline earth metal in the catalyst. That alkaline earth metal can be either barium, strontium or calcium. Preferably the alkaline earth metal is barium. The alkaline earth metal can be incorporated into the zeolite by synthesis, impregnation or ion exchange. Barium is preferred to the other alkaline earths because the resulting catalyst has high activity, high selectivity and high stability.

In one embodiment, at least part of the alkali metal is exchanged with barium, using techniques known for ion exchange of zeolites. This involves contacting the zeolite with a solution containing $Ba^{++}$ ions preferably in excess of the zeolite exchange capacity. The barium should preferably constitute from 0.1% to 35% of the weight of the zeolite, more preferably from 1% to 20% by weight.

Group VIII Metals

The reforming catalysts according to the invention are charged with one or more Group VIII metals, e.g., nickel, ruthenium, rhodium, palladium, iridium or platinum.

The preferred Group VIII metals are iridium and particularly platinum, which are more selective with regard to dehydrocyclization and are also more stable under the reforming reaction conditions than other Group VIII metals. The preferred percentage of platinum in the catalyst is between 0.1% and 5%, more preferably from 0.1% to 1.5%.

Group VIII metals are introduced into the zeolite by synthesis, impregnation or exchange in an aqueous solution of an appropriate salt. When it is desired to introduce two Group VIII metals into the zeolite, the operation may be carried out simultaneously or sequentially.

By way of example, platinum can be introduced by impregnating the zeolite with an aqueous solution of tetrammineplatinum (II) nitrate, tetrammineplatinum (II) hydroxide, dinitrodiamino-platinum or tetrammineplatinum (II) chloride. In an ion exchange process, platinum can be introduced by using cationic platinum complexes such as tetrammineplatinum (II) nitrate.

Catalyst Pellets

An acidic or acidifiable inorganic oxide can be used as a carrier to bind the large-pore size zeolite, to make the catalyst more selective and active for isomerization and dehydroisomerization, and to give the catalyst additional strength. The carrier can be a natural or a synthetically produced inorganic oxide or combination of inorganic oxides. Preferred loadings of inorganic oxide are from 5% to 50% by weight of the catalyst. Typical acidic inorganic oxide supports which can be used include silica-alumina, zirconia-silica and halogenated or halogenateable alumina.

It may be desirable to exchange the zeolite with an alkaline earth metal before binding the zeolite with a binder so that the catalyst is subjected to a minimum of exchangeable cations after it is bound. This could make the binder more amenable to effective chloriding than if it were substantially contaminated with alkali or alkaline earth metal ions.

In one embodiment, the zeolite is made, then the zeolite is ion exchanged with a barium solution, separated from the barium solution, dried and calcined, impregnated with platinum, dried, calcined, and optionally reduced in hydrogen at about 900° F., and then mixed with the inorganic oxide and extruded through a die to form cylindrical pellets, then the pellets are dried and calcined.

In another embodiment, the large-pore zeolite is mixed with the inorganic oxide and extruded through the die to form cylindrical pellets, then the pellets are dried and calcined, then these pellets are ion exchanged with a barium solution, separated from the barium solution, impregnated with platinum, separated from the platinum solution, dried and calcined. It may be desirable to have a small portion of the platinum on the binder itself. In this way, one can obtain close proximity of the acid function and the metal function. This could also serve to keep the binder more clean (more free of coke).

After the desired Group VIII metal or metals have been introduced, the catalyst is treated in air at about 260° C. and then reduced in hydrogen at temperatures of from 200° C. to 700° C., preferably 300° C. to 620° C. At this stage the reforming catalyst is ready for use in the reforming process.

The degree of isomerization can be controlled on stream by adjusting the amount of halogen-containing gas or the amount of water vapor in the gas stream. Adding more halogen-containing gas (less water vapor) makes the process less selective for dehydrocyclization and more selective for isomerization and dehydroisomerization (and to some extent, hydrocracking). Any halogen-containing gas may be used, but a preferred halogen-containing gas is hydrochloric acid. Another preferred halogen-containing gas, which is a gas at reforming conditions, but is a liquid at room temperature and atmospheric pressure, is tertiary butyl chloride.

While the present invention has been described with reference to specific embodiments, this application is intended to cover those various changes and substitutions which may be made by those skilled in the art without departing from the spirit and scope of the appended claims.

What is claimed is:

1. A hydrocarbon conversion process comprising contacting a hydrocarbon feed with a reforming catalyst in the presence of a halogen at conditions which favor dehydrocyclization, isomerization, and dehydroisomerization of the hydrocarbon feed; wherein said reforming catalyst comprises a type L zeolite containing at least one Group VIII metal and an alkaline earth metal selected from the group consisting of barium, strontium and calcium.

2. A hydrocarbon conversion process according to claim 1 wherein the degree of said isomerization and dehydroisomerization is controlled by adjusting the amount of said halogen-containing gas.

3. A hydrocarbon conversion process according to claim 1 wherein said halogen-containing gas is chlorine-containing gas.

4. A hydrocarbon conversion process according to claim 1 wherein said alkaline earth metal is barium and wherein said Group VIII metal is platinum.

5. A hydrocarbon conversion process according to claim 4 wherein the zeolite portion of said reforming catalyst has from 8% to 15% by weight barium and from 0.6% to 1.5% by weight platinum.

6. A hydrocarbon conversion process according to claim 1 wherein at least 80% of the crystals of said type L zeolite are larger than 1000 Angstroms.

7. A hydrocarbon conversion process according to claim 1 wherein said reforming catalyst comprises:
   (a) a type L zeolite containing barium and platinum; and
   (b) an acidic or acidifiable inorganic binder.

8. A hydrocarbon conversion process according to claim 7 wherein said inorganic binder is selected from the group consisting of silica-alumina, zirconia-silica, and alumina.

9. A hydrocarbon conversion process comprising contacting a hydrocarbon feed with a reforming catalyst in the presence of a chlorine-containing gas at conditions which favor dehydrocyclization, isomerization, and dehydroisomerization of the hydrocarbon feed; wherein the degree of said isomerization and dehydroisomerization is controlled by adjusting the amount of said chlorine-containing gas; and wherein said reforming catalyst comprises:
   (a) a type L zeolite containing from 8% to 15% by weight barium and from 0.6% to 1.5% by weight platinum, wherein at least 80% of the crystals of said type L zeolite are larger than 1000 Angstroms, and an alkaline earth metal selected from the group consisting of barium, strontium and calcium; and
   (b) an acidic or acidifiable inorganic binder selected from the group consisting of silica-alumina, zirconia-silica and alumina.

* * * * *